US012589886B2

(12) United States Patent
Martin et al.

(10) Patent No.: US 12,589,886 B2
(45) Date of Patent: *Mar. 31, 2026

(54) COLLAPSIBLE COVER FOR ENGINE INLET AND METHOD FOR COVERING ENGINE INLET

(71) Applicant: Gulfstream Aerospace Corporation, Savannah, GA (US)

(72) Inventors: Andrew Martin, Savannah, GA (US); Kristin Medin, Savannah, GA (US); Scott Bohanan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,380

(22) Filed: Aug. 28, 2024

(65) Prior Publication Data

US 2024/0417104 A1      Dec. 19, 2024

Related U.S. Application Data

(63) Continuation of application No. 17/648,971, filed on Jan. 26, 2022, now Pat. No. 12,097,972.

(51) Int. Cl.
*B64F 1/00* (2024.01)
*A45B 23/00* (2006.01)
*F02C 7/04* (2006.01)

(52) U.S. Cl.
CPC ............... *B64F 1/005* (2013.01); *F02C 7/04* (2013.01); *A45B 2023/0081* (2013.01); *F05D 2220/323* (2013.01); *F05D 2230/60* (2013.01)

(58) Field of Classification Search
CPC ..... B64F 1/005; F02C 7/04; A45B 2023/0081
See application file for complete search history.

(56) References Cited

U.S. PATENT DOCUMENTS 1,752,821 A * 4/1930 Timblin ................. A45B 13/00
                                                135/19.5
3,205,904 A * 9/1965 Kreachbaum .......... A45B 19/00
                                                135/15.1
(Continued)

FOREIGN PATENT DOCUMENTS

CN          106864759 A        6/2017
CN          113401368 A        9/2021
DE      202009014217 U1        4/2010

OTHER PUBLICATIONS

JetBrella Youtube Installation Video—JetBrella, G280, CL 300/CL350, Legacy 450/500 Inlet Covers—HTF7000—JetBrella Engine Covers, Feb. 2, 2017, https://www.youtube.com/watch?v=iHkAX7gQD8s (Year: 2017).*

(Continued)

*Primary Examiner* — Brian Christopher Delrue
(74) *Attorney, Agent, or Firm* — Ingrassia Fisher & Lorenz, LLP

(57)      ABSTRACT

An engine inlet cover and a method for covering an engine inlet are provided. A method for covering an engine inlet includes providing a collapsible cover comprising a connection pin defining an axis; a frame including interconnected arms; and a web. Further, the method includes storing the collapsible cover in a stowed configuration in which the arms are aligned. Also, the method includes rotating the arms from the stowed configuration to an operating configuration in which the arms are radially spaced about the axis, enclosing the frame in the operating configuration with the web to define an interior volume, and placing the cover over the engine inlet.

19 Claims, 7 Drawing Sheets

(56)                    References Cited

U.S. PATENT DOCUMENTS

| | | | |
|---|---|---|---|
| 3,646,980 A | | 3/1972 | Peterson |
| 3,726,295 A | * | 4/1973 | Diaz ...................... A45B 19/00 |
| | | | 135/25.31 |
| 4,836,232 A | * | 6/1989 | De Rosa ............... E04H 15/003 |
| | | | 135/147 |
| 2006/0107980 A1 | * | 5/2006 | Freestone ............. A45B 23/00 |
| | | | 135/20.1 |
| 2008/0107980 A1 | | 5/2008 | De Jong et al. |
| 2011/0030744 A1 | * | 2/2011 | Yun ........................ A45B 23/00 |
| | | | 135/20.1 |
| 2012/0145207 A1 | * | 6/2012 | VanVonderen .......... E04H 15/28 |
| | | | 135/98 |
| 2015/0089879 A1 | | 4/2015 | Sparks et al. |

OTHER PUBLICATIONS

Jetbrella, Falcon 2 Spec Sheet—Wayback Machine Archive, Dec. 1, 2020 (Year: 2020).*

Jetbrella, Inlet Cover Dual Vent Design—Wayback Machine Archive Oct. 28, 2021 (Year: 2021).*

JetBrella—Inlet Covers Description Jet Engine Inlet Covers—Jan. 20, 2018 (Year: 2018).*

* cited by examiner

COLLAPSIBLE COVER FOR ENGINE INLET AND METHOD FOR COVERING ENGINE INLET

CROSS-REFERENCE TO RELATED APPLICATIONS

This application is a continuation of U.S. application Ser. No. 17/648,971, filed on Jan. 26, 2022, the disclosure of which is incorporated herein by reference in its entirety.

TECHNICAL FIELD

The technical field generally relates to an engine inlet, and more particularly relates to a collapsible cover for an engine inlet, and a method for covering an engine inlet.

BACKGROUND

During cold weather operations, there are many scenarios where covering the engine inlets of a vehicle such as an aircraft is recommended. One example is when the aircraft is stored outside for an extended period of time (i.e., overnight or for multiple days) and is exposed to snow/ice contaminants. A second example is when covering the engine inlets may help retain heat from a recently operated engine core, which can help melt any ice that may have accreted on the engine fan blades during a recent flight through icing conditions.

Several types of covers exist for use during these circumstances. However, currently available covers are often difficult to install and may require multiple people, as well as additional equipment. For example, multiple ladders or lifts/stands may be necessary to complete the installation/removal process. Often this equipment is not available at the location of the aircraft. Further, currently available covers are also often bulky and difficult to carry on smaller aircraft. Often, the cover is designed to be positioned inside the inlet, but in front of the engine fan. Such designs do not cover the entire engine inlet, and thus require additional cleaning of any ice/snow that may have accumulated inside the inlet before the engine can be operated. In addition, some engine covers are designed to rest on part of the rotating engine turbomachinery. This can be problematic in windy scenarios where the engine fan may be rotating while the engine covers are being installed.

Accordingly, it is desirable to provide an engine inlet cover that is lightweight and can be easily installed by a single pilot using a ladder, collapsible and compact for easy storage, able to cover the entire engine inlet to prevent intrusion of contaminants while not touching any part of the engine fan/nose cone when installed, and robust enough to survive extended use in the operating environment. It is also desirable to provide a method for installing such an engine inlet cover. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments/examples of a collapsible cover for an engine inlet, and a method for covering an engine inlet are disclosed herein.

In a first non-limiting embodiment, a method is provided for covering an engine inlet. The method includes, but is not limited to, providing a collapsible cover including a connection pin defining an axis; a frame including interconnected arms; and a web. The method also includes, but is not limited to, storing the collapsible cover in a stowed configuration in which the arms are aligned. Further, the method includes, but is not limited to, rotating the arms from the stowed configuration to an operating configuration in which the arms are radially spaced about the axis. Also, the method includes, but is not limited to, enclosing the frame in the operating configuration with the web to form a cup with an interior volume, and placing the cover over the engine inlet.

In another non-limiting embodiment, a collapsible cover for an engine inlet is provided. The collapsible cover includes, but is not limited to, a connection pin defining an axis. Further, the collapsible cover includes, but is not limited to, a frame including interconnected arms. Each exemplary arm extends from a proximal end to a distal end, and the proximal end of each arm receives or is integral with the connection pin. Further, each arm is rotatable about the axis between a stowed configuration of the frame, in which the arms are aligned, and an operating configuration in which the arms are radially spaced about the axis. The collapsible cover also includes, but is not limited to, a web configured to enclose a top side of the frame in the operating configuration. The exemplary collapsible cover forms a cup with an interior volume for receiving the engine inlet.

In another non-limiting embodiment, a vehicle is provided. The vehicle includes, but is not limited to, an engine housing for an engine, wherein the engine housing defines an engine inlet. Also, the vehicle encloses an internal space. Further, the vehicle includes, but is not limited to, a collapsible cover for the engine inlet. The exemplary collapsible cover includes a connection pin defining an axis, a frame including interconnected arms that are rotatable about the axis between a stowed configuration of the frame, in which the arms are aligned and the collapsible cover is stowed within the internal space of the vehicle, to an operating configuration in which the arms are radially spaced about the axis and the engine housing is received within the cover; and a web configured to enclose a top side of the frame in the operating configuration.

Other desirable features will become apparent from the following detailed description and the appended claims, taken in conjunction with the accompanying drawings and this background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any theory presented in the preceding background or the following detailed description.

Described herein is a lightweight, collapsible cover for an engine inlet that may be easily converted to an operating configuration and installed by a single person without the use of specialized tools. Further, the collapsible cover may be collapsed to a stowed configuration within a minimized footprint for convenient storage within the internal volume of the vehicle. When in use, the collapsible cover extends over the entirety of the engine inlet to prevent any precipitation or contaminant from entering the engine housing. Also, the collapsible cover may prevent any wind force from entering the engine housing through the engine inlet to reduce unwanted spinning of the engine fan.

A greater understanding of the collapsible cover and methods for covering engine inlets discussed above may be obtained through a review of the illustrations accompanying this application together with a review of the detailed description that follows.

Figure 1:
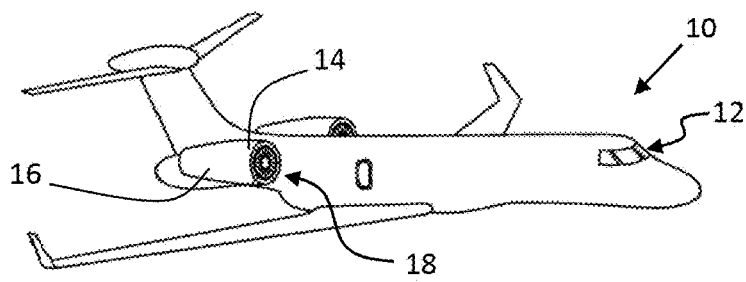
FIG. 1 is a perspective view of a non-limiting embodiment of a vehicle such as an aircraft in accordance with the teachings of the present disclosure.

Referring to FIG. 1, a vehicle, such as an aircraft like a turbofan jet, is shown and generally designated 10. As shown, vehicle 10 include an interior space 12. Further, vehicle 10 includes jet engines 14 that are held within engine housings 16, such as nacelles. As shown, the engine housings 16 define engine inlets 18 through which the engine 14 takes air in from the freestream during operation.

Figure 2:
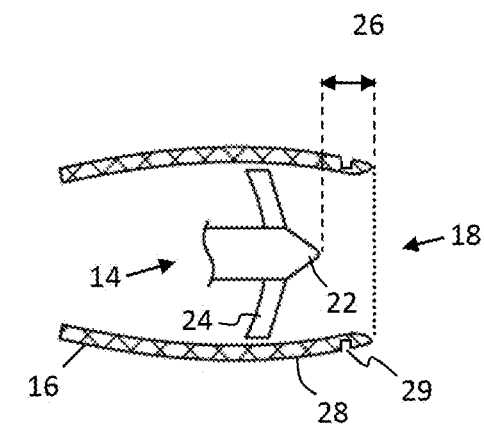
FIG. 2 is a cross-sectional view of an engine housing of FIG. 1.

FIG. 2 provides a cross-section schematic view of an engine housing 16 of FIG. 1. Specifically, only the fan section of the engine 14 is illustrated. As shown, the engine 14 includes a nose cone 22 and fan blades 24. As shown, the nose cone 22 of the engine 14 is set back within the engine housing 16 at a distance 26 from the engine inlet 18. Further, the engine housing 16 is shown to have an outer side surface 28 formed with two openings 29.

Figure 3:
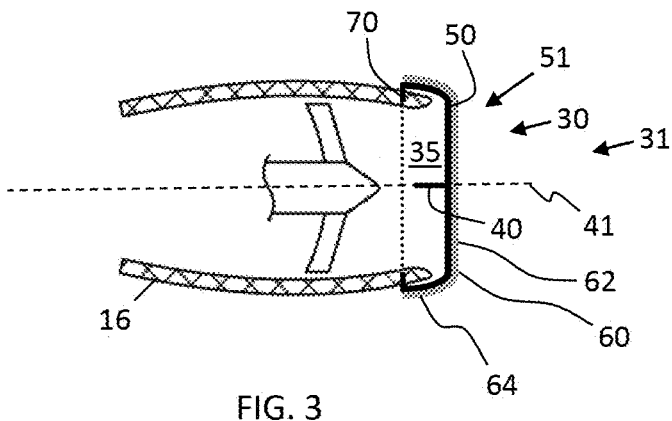
FIG. 3 is a cross-sectional view of the engine housing of FIG. 2, shown with a collapsible cover in the operating configuration and installed over the engine housing inlet in accordance with the teachings of the present disclosure.

FIG. 3 illustrates the use of a collapsible cover 30 to prevent precipitation or debris from entering engine inlet 18 while the vehicle 10 is parked. The collapsible cover 30 may also prevent turbofan engines 14 from spinning under wind load.

As shown, the illustrated collapsible cover 30 includes a connection pin 40, a frame 50, a web 60, and an engagement feature 70. In FIG. 3, the collapsible cover 30 is in an operating configuration 31. As shown, the web 60 is configured to enclose a top side 51 of the frame 50 in the operating configuration 31.

In the operating configuration 31, the cover 30 forms a cup shape centered about the axis 41 of the connection pin 40 and defines an internal volume 35. When the cover 30 is positioned on the engine housing 16, the forward portion of the engine housing 16, including the engine inlet 18, is received within the internal volume 35 of the cover 30. Further, when the cover 30 is positioned on the engine housing 16, anchoring or engagement features 70, such as pins, may be received within respective openings 29, as shown, to prevent accidental disengagement of the cover 30 and the engine housing 16.

While the illustrated embodiment includes an engagement feature 70 that engages openings 29 in engine housing 16, alternative or additional engagement features 70 for securing the cover 30 to the engine housing 16 may be provided. For example, engagement features 70 such as straps could attach the cover 30 to the back of the engine housing 16. Both types of engagement features 70 could be used to provide additional security in the face of high winds or other adverse conditions.

As shown, when the cover 30 is positioned on the engine housing 16, no portion of the cover 30 touches, or is near, the nose cone 22 or fan blades 24 to prevent incidental contact therebetween, and possible damage to the nose cone 22 or fan blades 24. Such design allows the cover 30 to be installed on the engine housing 16 while the internal engine components may still be turning due to external wind forces. Other cover types that rest on the engine nose cone may not provide such an ability.

Figure 4:
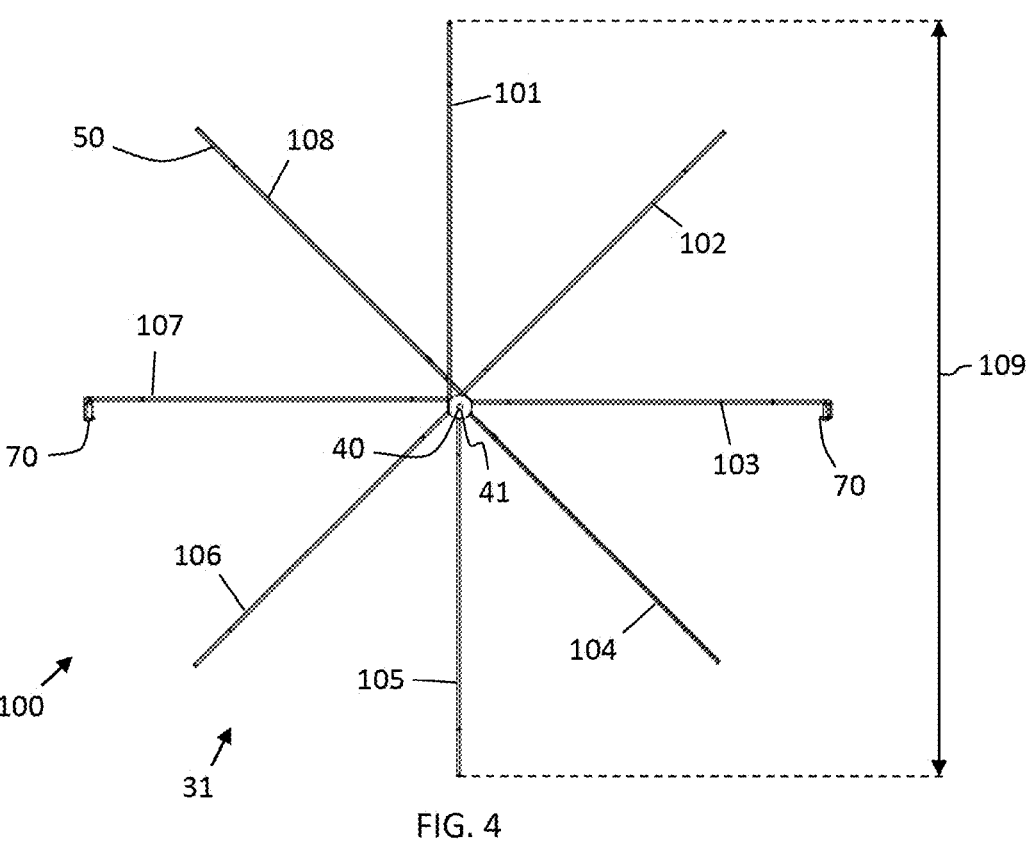
FIG. 4 is an overhead view of the frame and pin of the collapsible cover of FIG. 3, shown in the operating configuration in accordance with the teachings of the present disclosure.
Figure 5:
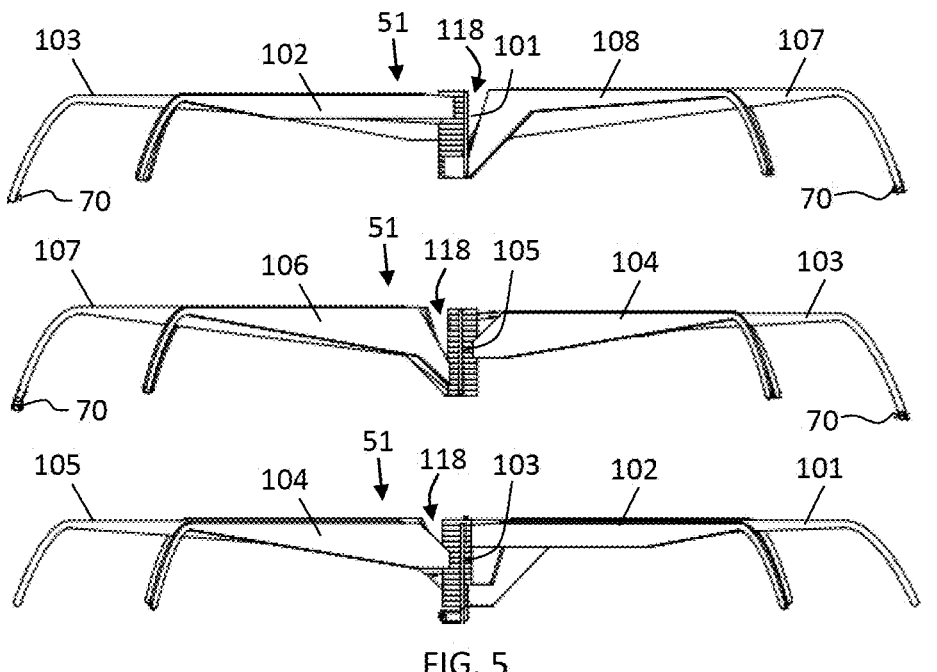
FIG. 5 includes three perspective views of the frame and pin of FIG. 4 in accordance with the teachings of the present disclosure.

FIGS. 4 and 5 illustrate the connection pin 40 and frame 50 in the operating configuration 31, with the web removed for clarity. FIG. 4 provides a view of the top side 51 of the frame 50, taken along the axis 41. FIG. 5 provides three perspective views of the connection pin 40 and frame 50 in the operating configuration.

As shown in FIGS. 4-5, the frame 50 is formed by a plurality of interconnected arms 100. While any suitable number of arms 100 may be used, the illustrated embodiment of the frame 50 includes eight arms 101-108. As shown, the arms 100 are radially spaced about the axis 41. In exemplary embodiments, the arms 100 are equidistantly spaced, such that, for eight arms 100, an angle of about forty-five degrees is formed between each pair of adjacent arms 100.

In exemplary embodiments, the arms 100 are designed to lock themselves in place at the desired radial spacing or hit a stop at the desired radial spacing, thus simplifying deployment from the user perspective. In other embodiments, the web may be sufficient to deploy the arms at the desired radial spacing as the distal ends of the arms 100 are sewed into the web as described below in refence to FIG. 11.

Still referring to FIGS. 4-5, the frame 50 may include an even or odd number of arms 100. Because engine housings 16 typically have an oval rather than circular cross section, the lengths of individual arms will differ in the respective radial direction to compensate for the non-circular cross section of the engine housing 16. In illustrated embodiments, the frame 50 includes an even number of arms 100, and each arm 100 is collinear or parallel with a corresponding opposite arm when the frame is in the operating configuration 31. In FIG. 4, pairs of opposite arms 100 include arms 101 and 105, arms 102 and 106, arms 103 and 107, and arms 104 and 108. A combined length of a pair of opposite arms 100 is designated by reference number 109. Due to the non-circular cross section of engine housings 16, the combined length 109 of pairs of opposite arms 100, such as arms 101 and 105, arms 102 and 106, arms 103 and 107, and arms 104 and 108, may differ in the respective radial direction.

As shown in FIG. 4, the pair of opposite arms 103 and 107 is configured for engagement with the engine housing to anchor the collapsible cover to the engine housing when in the operating configuration 31. Specifically, arms 103 and 107 include engagement features 70 for engagement with the engine housing.

Figure 6:
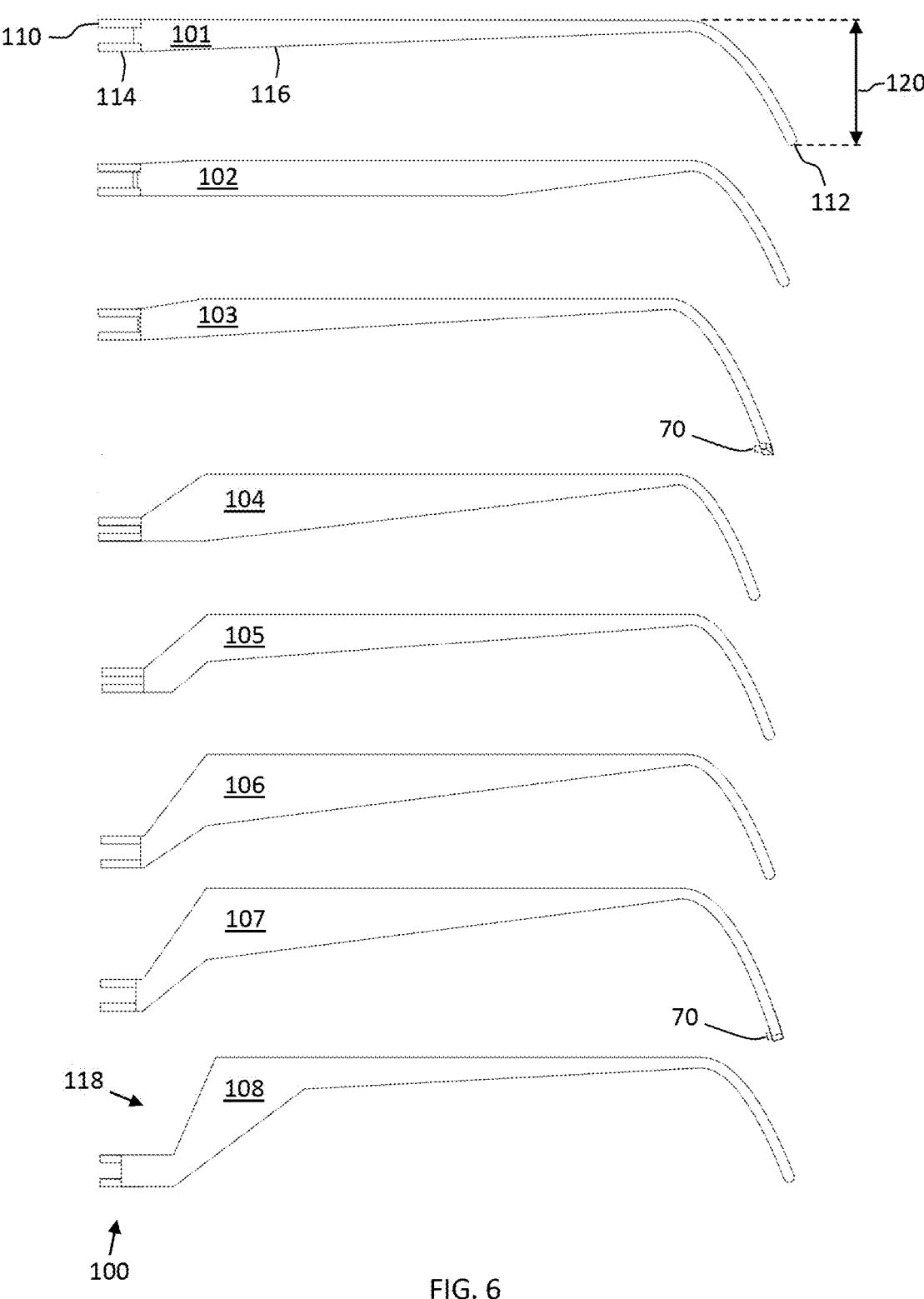
FIG. 6 includes a front view of each arm of the frame of FIGS. 4 and 5 in accordance with the teachings of the present disclosure.

FIG. 6 provides a front view of each arm 100, disconnected from the frame for clarity. As shown, each arm 100 has a proximal end 110 and a distal end 112. At the proximal end 110, each arm 100 forms an annular or cylindrical section 114 that is centered about the pin axis 41 when assembled as the frame 50. Connected to the cylindrical section 114 is a planar section 116 that extends to the distal end 112.

Figure 7:
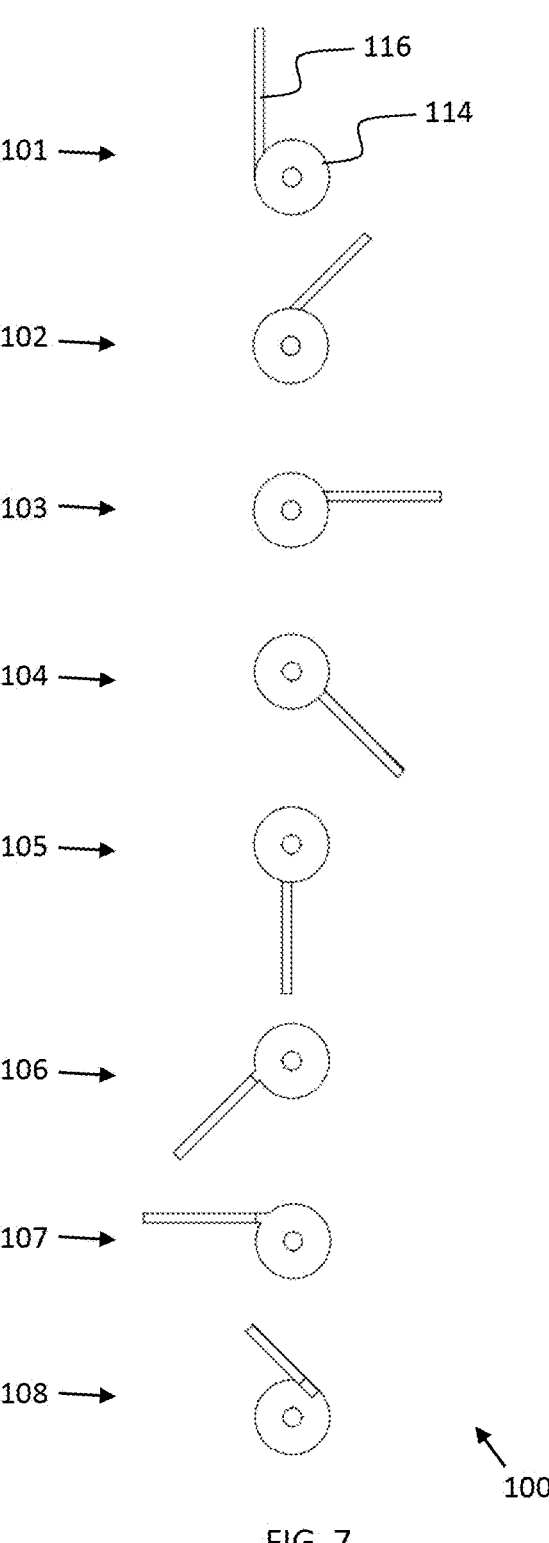
FIG. 7 includes an overhead view of the proximal end of each arm of FIG. 6 in accordance with the teachings of the present disclosure.

Referring now to FIG. 7, an overhead view of the cylindrical section 114 and a portion of the planar section 116 of each arm 100 is provided, with the orientation of each arm 100 shown with respect to the operating configuration. Specifically, each arm 100 is rotated forty-five degrees from the previous arm 100. Further, FIG. 7 illustrates that the planar section 116 may be connected to the cylindrical section 114 at a different location on the circumference of the cylindrical section 114. For example, for arms 101 and 108, the planar section 116 is connected to the cylindrical section 114 tangentially at opposite ends of the cylindrical section 114. Arms 104 and 105 have planar sections 116 that are connected to the cylindrical sections 114 in near alignment with the axis. Arms 102, 103, 106 and 107 have connections points that are stepped from arm 101 to arm 104 and from arm 105 to arm 108, respectively.

As shown in FIG. 6, the design of each arm 100 may differ to provide for movement between the operating configuration and a stowed configuration. As a result, each arm may have a unique maximum height 120 in the direction parallel to the axis 41. Further, in some embodiments, certain arms 100 may be selected for engagement with the engine housing. In the FIGS. 3-7, arms 103 and 107 are provided for engagement with the engine housing. Therefore, arms 103 and 107 may have a maximum height 120 that is greater than the maximum heights of the other arms 100. Further, an engagement feature 70 is provided at the distal end 112 of arms 103 and 107. The engagement feature 70 may be a pin or extension that extends toward the axis 41 for engagement with a respective opening in the housing. As noted above, in certain embodiments, the engagement feature 70 may, additionally or alternatively, include straps for attaching the cover to the engine housing.

Figure 8:
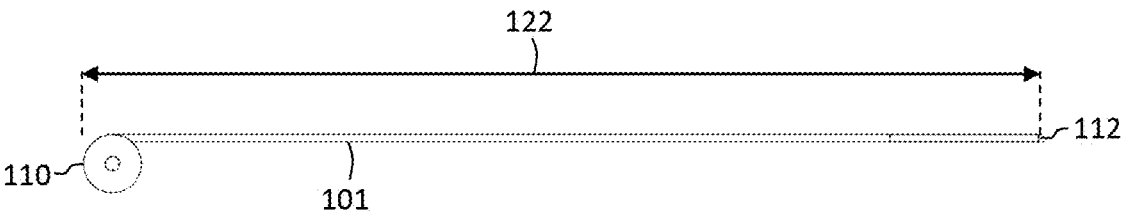
FIG. 8 is an overhead view of three selected arms of FIG. 6 in accordance with the teachings of the present disclosure.
Figure 8:
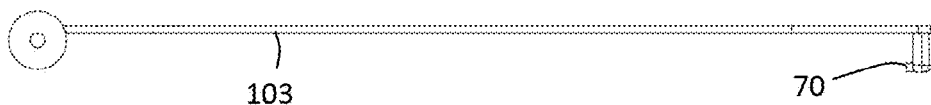
Figure 8:

FIG. 8 provides an overhead view of arms 101, 103 and 107. Arm 101 is illustrated as representative of arms 102, 104, 105, 106, and 108. For each of arms 101, 102, 104, 105, 106, and 108, the arm only includes a planar section 116 extending from the cylindrical section 114 to the distal end 112. For arms 103 and 107, the engagement feature 70 is shown more clearly in FIG. 8 as a hook-like feature for engagement with the engine housing. Such a design is merely one possibility for engagement between the cover and the engine housing. For example, in certain embodiments, the engagement feature 70 may include a pin receiver assembly and a separate pin may be passed through the pin receiver assembly and into the engine housing. Other suitable engagement features are contemplated.

FIG. 8 illustrates that each arm 100 has a length 122 in the direction perpendicular to the axis. Typically, the engine housing has an oval, rather than circular, cross sectional shape. Therefore, the lengths 122 of the arms 100 may differ to provide for fitting over the engine housing.

Figure 9:
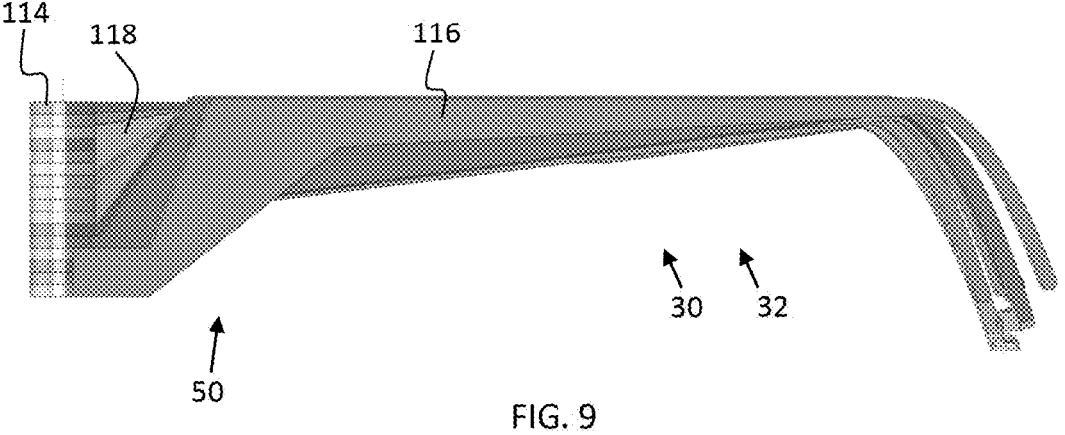
FIG. 9 is a front view of the frame of the collapsible cover of FIG. 3, shown in the stowed configuration in accordance with the teachings of the present disclosure.
Figure 10:
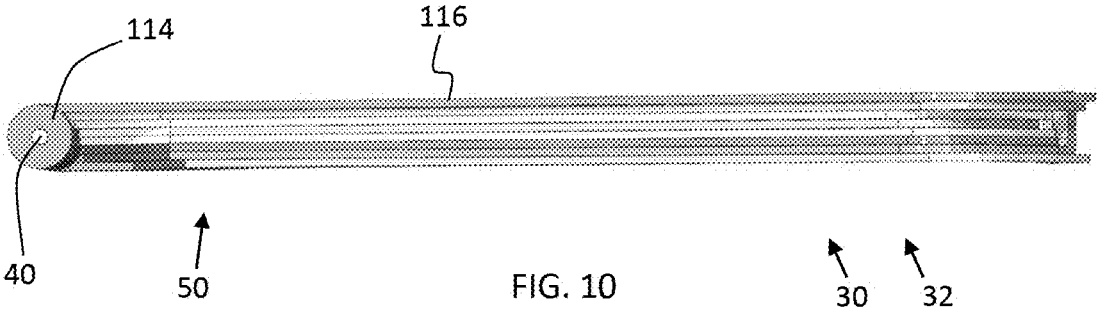
FIG. 10 is an overhead view of the frame and pin of the collapsible cover of FIG. 9, shown in the stowed configuration in accordance with the teachings of the present disclosure.

FIGS. 9 and 10 illustrate the frame 50 and connection pin 40 in the stowed configuration 32 of the cover 30. FIG. 9 is a side view and FIG. 10 is a top view. As shown in FIG. 10, the planar sections 116 of the arms 100 are aligned and lie parallel to one another in the stowed configuration 32 due to the offset connection between the planar sections 116 and the respective cylindrical sections 114 described above. In the stowed configuration 32, the arms 100 define a stack in which the planar sections of the arms are substantially parallel. As shown in FIG. 9 and FIGS. 5-6, the arms 100 may be designed with cut-out portions 118 near the proximal ends 110 to allow for unimpeded rotation of the arms 100 about the axis 41.

As may be understood from FIG. 9, the frame 50 includes a longest arm having a maximum length in a direction perpendicular to the axis. In the stowed configuration, the frame 50 has a length in the direction perpendicular to the axis equal to the maximum length. Further, the frame 50 includes a tallest arm having a maximum height in a direction parallel to the axis. In the stowed configuration, the frame 50 has a height in the direction parallel to the axis equal to the maximum height.

Figure 11:
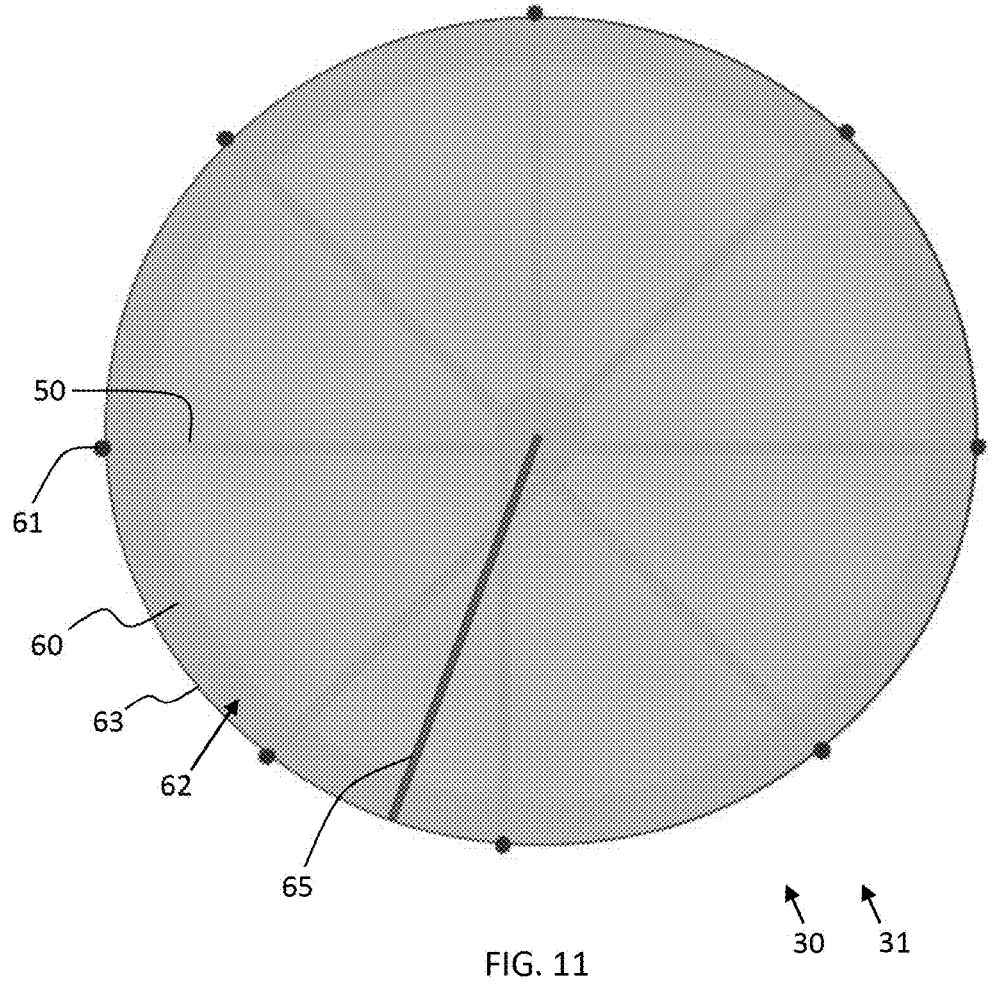
FIG. 11 is an overhead view of the frame, pin, and web of the collapsible cover of FIG. 4, shown in the operating configuration in accordance with the teachings of the present disclosure.

Referring to FIG. 11, details of the web 60 are described. FIG. 11 provides a top view of the cover 30 in the operating configuration 31, with the web 60 drawn taut over the frame 50 (partially seen through the web 60). An exemplary web 60 is flexible, thin, lightweight, and impervious. For example, the web 60 may be a fabric, foil, or other flexible substrate. An exemplary web 60 waterproof. Further, an exemplary web 60 may be lined with neoprene to prevent damage to the engine inlet when the cover is installed. If the web 60 is fabric or otherwise includes pores, the web 60 should be relatively closed pore enough that precipitation or small debris cannot pass through.

As shown, the web 60 includes sleeves 61 for receiving the distal ends of each respective arm in frame 50. The distal ends of the arms may be sewn into the sleeves 61 or may be friction fit therein to avoid non-purposeful disengagement. Cross-referencing FIG. 11 and FIG. 3, it is noted that the web 60 includes a generally oval central portion 62 with an outer circumferential edge 63. Further, the web 60 includes a downwardly extending portion 64 (shown in FIG. 3) along which the sleeves 61 are located.

Further, the web 60 is formed with a closure mechanism 65 to draw the web 60 taut after the arms are rotated to the operating configuration 31. For example, the web 60 may be formed with a slit that may be sealed with a zipper as the closure mechanism 65, as shown in FIG. 11. In order to avoid damage to the engine housing, the closure mechanism 65 may be provided with a flap or other structure that is located on the vehicle side of the closure mechanism 65 when in use.

In view of FIGS. 1-11, a method for covering an engine inlet is contemplated. In the method, the collapsible cover 30, in the stowed configuration 32, may be stored within the internal space 12 of the vehicle 10. When desired, a pilot or other user may remove and carry the collapsible cover 30 from the internal space 12 of the vehicle 10 to the engine housing.

The user may rotate the arms 100 about the axis 41 from the stowed configuration 32 to the operating configuration 31 in which the arms are radially spaced about the axis 41. The user may enclose the frame 50 in the operating configuration 31 with the web 60 to form a cup with an internal volume 35. Enclosing the frame 50 with the web 60 may include closing the closure mechanism 65 to draw the web 60 taut. The user may place the cover 30 over the engine inlet 18 such that a portion of the engine housing 16 is received within the internal volume 35 of the cover 30. Further, the user may secure or fix the cover 30 to the engine housing 16 by inserting an engagement feature 70 from an arm or arms 100 into an opening or openings 29 in the outer side surface 28 of the engine housing 16. In other words, the user may engage a distal end 112 of a selected arm 100 with the outer side surface 28 of the engine housing 16.

To uninstall the cover 30, the user may disengage the engagement feature 70 from the engine housing 16, including disengaging pins and/or straps or other engagement features, and remove the cover 30 from the engine housing 16. The user may open the closure mechanism 65 to loosen the web 60 and release tension from the frame 50 in the operating configuration 32. The user may rotate the arms 100 back to the stowed configuration 32, and carry the cover 32 into the internal space of the vehicle for storage.

It is noted that while embodiments have described embodiments in which the connection pin 40 and the frame 50 are independent structures, i.e., the connection pin 40 is separate from the frame 50, it is contemplated that the connection pin 40 may be formed by features of the arms of the frame 50 that are fitted together, i.e., the connection pin 40 is part of the frame 50.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for covering an engine having a nose cone within an engine inlet, the method comprising:

providing a collapsible cover comprising a pin defining an axis, a frame including arms, wherein the arms are configured to move between a stowed configuration and an operating configuration in response to a rotary force, and a web;

storing the collapsible cover in the stowed configuration in which the arms are retracted;

applying the rotary force to move the arms from the stowed configuration to the operating configuration in which the arms extend to distal ends that are radially spaced about the axis, wherein the frame is enclosed with a web that defines an interior volume; and placing the collapsible cover over the engine inlet, wherein the collapsible cover does not contact the nose cone.

2. The method of claim 1, wherein the engine inlet is located within an engine housing, and wherein placing the collapsible cover over the engine inlet comprises receiving a portion of the engine housing within the interior volume of the collapsible cover.

3. The method of claim 2, further comprising securing the collapsible cover to the engine housing by engaging the distal ends of the arms with the engine housing.

4. The method of claim 3, further comprising securing the collapsible cover to the engine housing by engaging the engine housing to anchor the collapsible cover.

5. The method of claim 3, further comprising securing the collapsible cover to the engine housing by engaging a strap connected to the web with the engine housing.

6. The method of claim 3, wherein the engine housing has an exterior surface, and wherein engaging the distal ends of the arms with the engine housing comprises engaging the distal ends of the arms with the exterior surface of the engine housing.

7. The method of claim 6, wherein the engine housing defines an internal space, and wherein after placing the collapsible cover over the engine inlet, a portion of the collapsible cover is located within the internal space.

8. The method of claim 6, further comprising:

removing the collapsible cover from the engine inlet; and applying an opposite rotary force using the rotation device to move the arms from the operating configuration to the stowed configuration.

9. The method of claim 8, wherein the web is formed with sleeves, and wherein a distal end of each arm passes through a respective sleeve.

10. The method of claim 1, wherein enclosing the frame in the operating configuration with the web comprises closing a closure mechanism to draw the web taut.

11. The method of claim 1, wherein the engine inlet is defined by an engine housing having an outer side surface with openings, and wherein placing the collapsible cover over the engine inlet further comprises inserting an engagement feature extending from at least one of the arms into a corresponding opening in the outer side surface of the engine housing.

12. The method of claim 1, wherein the web comprises sleeves, wherein the method further comprises inserting the distal end of each arm through a respective sleeve of the web prior to placing the collapsible cover over the engine inlet.

13. The method of claim 1, wherein the collapsible cover is stored within an internal space of a vehicle containing the engine, the method further comprising removing the collapsible cover from the internal space of the vehicle prior to applying the rotary force.

14. The method of claim 1, wherein the frame comprises eight arms that are equidistantly spaced in the operating configuration such that an angle of approximately forty-five degrees is formed between each pair of adjacent arms.

15. The method of claim 1, wherein each arm comprises:

a cylindrical section at a proximal end centered about the axis; and a planar section extending from the cylindrical section to the distal end.

16. The method of claim 15, wherein the planar section of each arm connects to the cylindrical section at a different circumferential location, enabling the arms to align parallel to one another in the stowed configuration.

17. The method of claim 1, wherein the engine inlet has an oval cross-section, and wherein the arms have different lengths in their respective radial directions to accommodate the oval cross-section of the engine inlet.

18. The method of claim 1, wherein the web comprises a neoprene lining configured to prevent damage to the engine inlet when the collapsible cover is placed thereon.

19. The method of claim 1, wherein at least one of the arms includes a cut-out portion near its proximal end to allow unimpeded rotation of the arms about the axis.

* * * * *